United States Patent [19]
Laham

[11] 3,768,441
[45] Oct. 30, 1973

[54] ANIMAL REPELLING DEVICE
[76] Inventor: George K. Laham, 160 Beech St., Boston, Mass. 02131
[22] Filed: Jan. 27, 1972
[21] Appl. No.: 221,191

[52] U.S. Cl. ..................................... 119/1, 119/96
[51] Int. Cl. ............................................ A01k 29/00
[58] Field of Search .................... 119/1, 96; 47/23; 43/108

[56] References Cited
UNITED STATES PATENTS
2,999,479  9/1961  Carder ................................ 119/1
2,233,832  3/1941  Byrd ................................. 119/96
FOREIGN PATENTS OR APPLICATIONS
260,245  7/1949  Switzerland ......................... 119/96

Primary Examiner—Louis G. Mancene
Assistant Examiner—J. N. Eskovitz
Attorney—Harold E. Cole

[57] ABSTRACT

An animal repelling device has a repeller member formed of two pivotally connected sections each having cut-out portions providing an opening to receive a post or drain pipe on which the device is mounted. Each section has a flange below that borders said opening, and each has a catch member at the front which can be fastened together to hold the repeller member firmly in place.

3 Claims, 5 Drawing Figures

PATENTED OCT 30 1973 3,768,441

ANIMAL REPELLING DEVICE

The principal object of my invention is to provide such a device that can be attached at any point along a drain pipe without first having to slip it over the top or bottom of the pipe, and which serves to prevent a squirrel or other animal from using the drain pipe to travel to a point where he is not wanted. A further object is to provide such a device that is simple in construction, inexpensive to manufacture, and easy to mount or remove from a drain pipe or other support.

The foregoing and other objects which will appear as the nature of the invention is better understood, may be accomplished by a construction, combination and arrangement such as is disclosed by the drawing. The nature of the invention is such as to render it susceptible to various changes and modifications, and therefore, I am not to be limited to the construction disclosed by the drawing, nor to the particular parts described in the specification; but am entitled to all such changes therefrom as fall within the scope of my claims.

As illustrated, my animal repelling device has a baffle or repeller 10 having two sections 12 and 14 at the left and right thereof. At the front end each of said sections 12 and 14 is an angular catch member 12a and 14a respectively, which are adjacent to each other when said sections are in closed position. Each said section 12 and 14 extends laterally and straight at the rear, while the adjoining outside portions of each extend forwardly and arcuately.

Figures 4, 5:
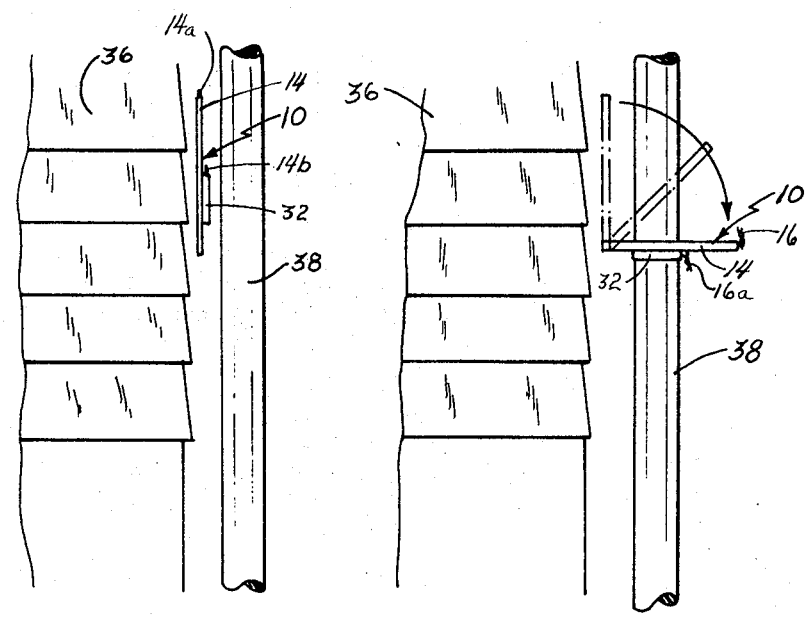
FIG. 4 is front elevational view showing a drain pipe at the side of a house with my device positioned rearwardly of the pipe ready to be moved to position for attachment to said pipe.
FIG. 5 is a view similar to FIG. 4, but showing my device attached to said drain pipe, the dash lines indicating how the repeller sections are moved to position ready for attachment to said pipe.

Said repeller 10 has a central opening 15 at the rear, which is formed by two cut-outs that are preferably arcuately shaped, being defined respectively by bordering portions 15a and 15b in said sections 12 and 14. Said central opening 15 is large enough to extend around a post or drain pipe 38, as illustrated in FIGS. 4 and 5 and later referred to.

Said section 12 has a connector hole 24 therethrough at its rear end, while said section 14 has a centrally perforated fork 22 at its rear end that aligns with said hole 24 whereby a rivet 20 is received and headed over as at 28 to thereby pivotally connect said sections 12 and 14.

Extending around the periphery of said opening 15 and downwardly is a flange 30 attached to said section 12, while another and similar flange 32 is attached to said section 14. Said flanges take the shape of a collar when in closed position. As shown said flange sections 30 and 32 each have angular catch members 12b and 14b, similar to catch members 12a and 14a.

In use, since animals such as squirrels, climb on houses, and often run along a drain pipe 38, which, for illustration, I have shown next to the side 36 of a house. To attach my device, the sections 12 and 14 are first swung open, at the rear of said drain pipe, being held vertically in position. Said sections 12 and 14 are then drawn outwardly and downwardly at opposite sides of the drain pipe 38 and moved to closed position around said pipe. Thus, the latter extends through said opening 15, with the border portions 15a and 15b in contact with it. Then the catch members 12a and 14b are fastened by a wire 16 or the like. If desired, the catch members 12b and 14b are likewise fastened by a wire 16a.

Figure 1:
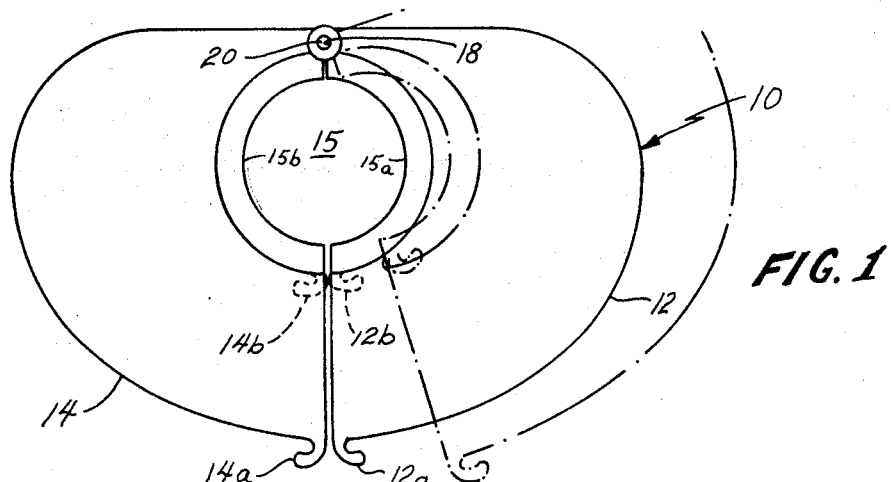
FIG. 1 is a top plan view of my repelling device in closed position, the broken line indicating one section of the repeller being moved to open position.
Figure 2:
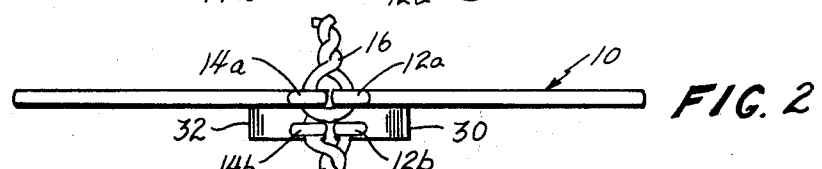
FIG. 2 is a front elevational view of said repelling device in closed position, both pairs of catch members carried by the repelling sections being respectively fastened by wires.
Figure 3:
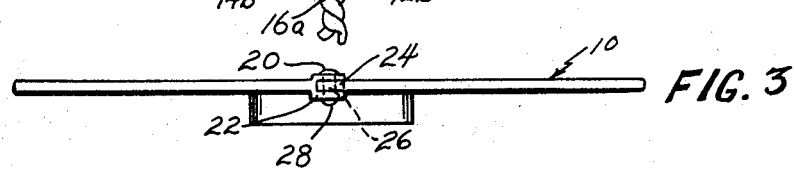
FIG. 3 is a rear elevational view of my device in closed position.

As shown in said FIGS. 1 and 5, the greater portion of the area of said two sections 12 and 14 is forward of said opening 15 and drain pipe 38 as compared with the portion rearwardly thereof.

My repeller may be formed of metal, plastic or other suitable material. It may be varied in shape, and the material may be corrugated. In closed position a suitable size could be 9 inches across one way, and 6½ inches the other way. The diameter of the opening 15 to receive a drain pipe could be 3¼ inches. However, the measurements could be greatly varied depending upon conditions of use.

I claim:

1. An animal repelling device comprising a repeller having two movable sections having planar surfaces and being laterally opposite each other, means movably connecting said sections, each said section having a cut-out laterally opposite each other and adjacent the rear of each and forwardly of said means, said cut-outs defining an opening intermediate opposite sides of said repeller, each said section having a flange portion depending perpendicularly downward from said cut-out edges and from said planar surfaces whereby to provide a collar when said sections are in closed position.

2. An animal repelling device as of claim 1, said means having a perforated fork connected to one said section, the other said section having a hole adjacent an end extremity thereof, and a rivet extending through said fork and said hole to thereby pivotally join said sections.

3. An animal repelling device as of claim 1, each of said sections extending straight laterally at the rear thereof.

* * * * *